United States Patent [19]
Sekiyama

[11] Patent Number: 4,894,992
[45] Date of Patent: Jan. 23, 1990

[54] TURBO COMPOUND ENGINE

[75] Inventor: Shigeo Sekiyama, Kawasaki, Japan

[73] Assignee: Isuzu Motors Limited, Tokyo, Japan

[21] Appl. No.: 263,670

[22] Filed: Oct. 27, 1988

[30] Foreign Application Priority Data

Oct. 28, 1987 [JP] Japan ................... 62-270330

[51] Int. Cl.$^4$ .............................................. F02G 5/00
[52] U.S. Cl. ...................................................... 60/624
[58] Field of Search ................................... 60/614, 624

[56] References Cited

U.S. PATENT DOCUMENTS

| | | | |
|---|---|---|---|
| 2,375,852 | 5/1945 | Kitchenmann | 60/624 X |
| 4,748,812 | 6/1988 | Okada et al. | 60/624 X |
| 4,800,726 | 1/1989 | Okada et al. | 60/624 X |

FOREIGN PATENT DOCUMENTS

| | | | |
|---|---|---|---|
| 61-921 | 3/1986 | Japan | 60/624 |
| 286531 | 12/1986 | Japan | 60/624 |

Primary Examiner—Michael Koczo
Attorney, Agent, or Firm—Dykema Gossett

[57] ABSTRACT

A turbo compound engine comprising an engine, a power turbine provided in the exhaust gas passage of the engine, the power turbine being rotatable both in normal and reverse senses, a reversing mechanism including a friction type clutch connecting the power turbine with the crankshaft, with the rotating direction of the power turbine being reversed when the friction type clutch is switched into its engagement mode, and an oil pump and a controller therefor which, in combination, cause the friction type clutch to produce frictional torque large enough to stop the power turbine as the clutch is switched to its engagement mode and further to produce a larger amount of frictional torque within its upper limit when required.

6 Claims, 5 Drawing Sheets

TURBO COMPOUND ENGINE

BACKGROUND OF THE INVENTION

1. Technical Field

The present invention relates to a turbo compound engine system provided with a power turbine for recovering the exhaust gas energy and returning the recovered energy to the crankshaft of the engine. More particularly, the present invention relates to a turbo compound engine system which produces braking effort by allowing the power turbine to be rotated in a reverse sense by the crankshaft when a vehicle is decelerated.

2. Background Art

The Assignee of the present invention disclosed a "Turbo Compound Engine" in Japanese Patent Application No. 61-228107 which is a System for obtaining braking effort by rotating a power turbine in a reverse sense with the power turbine being provided in the exhaust gas line of the engine.

According to the above mentioned application, as depicted in FIG. 6, a power turbine 151 for recovering the exhaust gas energy is provided in the exhaust gas line 153, a fluid passage 155 which bypasses the power turbine 151 is connected to the exhaust gas line 153, and a fluid passage switching means 159 is provided to the fluid passage 155. The fluid passage switching means 159 is constructed such that the exhaust gas line 153a parallel to the fluid passage 155 may be closed when the exhaust brake is applied and rotation power is transmitted from the crankshaft 157 to the power turbine 151 while opening the fluid passage 155.

The power turbine 151 has to be driven at a rotational speed between 80,000 and 100,000 rpm in order to effectively exhibit its characteristics. Therefore, when the power turbine 151 is reversed in its rotational direction, a considerable load is imposed on a power transmission system 161 between the crankshaft 157 and the power turbine 151.

As indicated by braking effort characteristic curve I in FIG. 5, if the power turbine 151 functions as a compressor as the rotation of the power turbine 151 is reversed from its normal direction to its reverse direction, the load against the crankshaft 157 sharply increases, which is called overshoot, just after the rotation of the power turbine 151 reaches zero, i.e., just after the power turbine 151 starts rotating in a reverse sense. This is because the power turbine performs both compressor work and air mixing work when it is reversed. To overcome this shortcoming with the turbo compound engine of the above mentioned Japanese Patent application, the power transmission system 161 between the crankshaft 157 and the power turbine 151 has to possess enough strength to counterbalance the overshoot or the power turbine has to be rotated slow enough not to damage the power transmission system 161. Either case is not optimal in terms of total braking effort and cost.

SUMMARY OF THE INVENTION

One object of the present invention is to provide a turbo compound engine system in which overshoot will not occur.

Another object of the present invention is to provide a turbo compound engine system which produces a desired, large braking force while not affecting the power transmission system between the crankshaft and the power turbine.

According to one aspect of the present invention, there is provided a turbo compound engine comprising an engine provided with an intake air line, an exhaust gas line and a crankshaft, a power turbine disposed in the exhaust gas line of the engine, a reversing mechanism interposed between the crankshahft and the power turbine and equipped with a friction type clutch, so that the rotational direction of the power turbine may be reversed relative to the same of the crankshaft upon a connection-mode switching of such clutch, and biasing means which causes the clutch to produce frictional torque large enough to stop the power turbine as the clutch is switched to the connection mode and further to produce larger frictional torque within its upper limit when required.

According to the turbo compound engine constructed as described above, the power turbine which has been rotating in normal direction by the exhaust gas in the exhaust gas line receives from the crankshaft power acting against its rotational direction as the friction type clutch is switched to its connection mode because of the reversing mechanism, whereby the rotation of the crankshaft is decelerated. The biasing means, in the meantime, presses said friction clutch with a relatively low pressure, which may be just enough to reduce the power turbine rotation to zero, until a certain condition is met and then presses the clutch with a pressure larger than the previous one when the previous pressure is not adequate to effect connection between the crankshaft and the power turbine which now rotates in a reverse sense. In this manner, the crankshaft and the power turbine are not connected to each other with too large a friction force at one occasion, thereby preventing the overshoot of braking force.

DESCRIPTION OF THE PREFERRED EMBODIMENTS

Now, preferred embodiments of the present invention will be explained with reference to the accompanying drawings.

Figure 2:
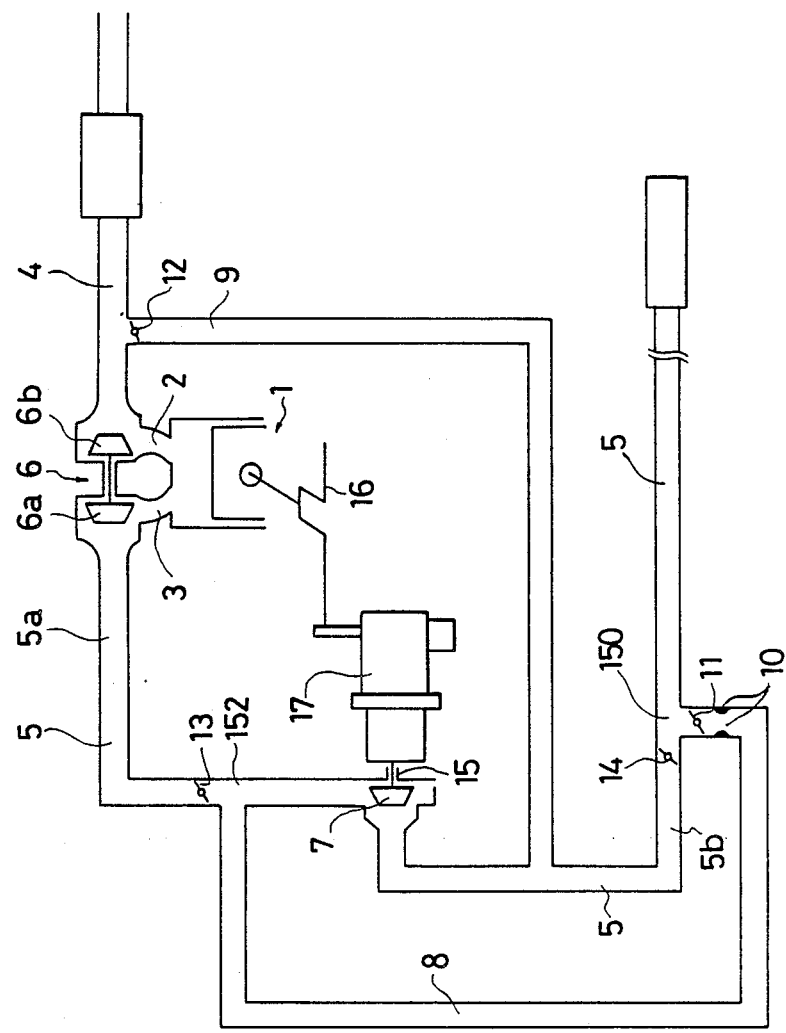
FIG. 2 is a schematic view showing a preferred embodiment of the turbo compound engine, provided with the reversing mechanism of FIG. 1.

Referring to FIG. 2, reference numeral 1 designates an engine, 2 an intake air port of the engine 1, and 3 an exhaust port of the engine 1. As illustrated in FIG. 2, an intake air passage 4 is connected to the intake air port 2, and an exhaust gas passage 5 is connected to the exhaust gas port 3. Near the upstream end of the exhaust gas line 5 a turbine 7 for recovering turbocharger 6 is disposed, and a power turbine 6a of the the exhaust gas energy is disposed downstream of the turbine 6a in the exhaust gas line 5. The compressor 6b of the turbocharger 6 is provided near the downstream end of the intake air passage 4. An exhaust gas bypass line 8 is provided to the exhaust line 5 with one end 152 being connected to the exhaust line 5a upstream of the power turbine 7 and the other end 150 being connected to the exhaust line 5b downstream of the power turbine 7. An intake air bypass line 9 is connected to the exhaust line 5 at one end which is upstream of the turbine 6b and the intake line 4 at the other end which is downstream of the power turbine 7 but upstream of the junction 150.

Near the downstream end of the exhaust bypass line 8, a fixed throttling 10 which adjusts the exhaust gas flow rate is formed and downstream thereof a shut-off valve 11 is provided. Another shut-off valve 12 is provided in the intake bypass line 9 near the upstream end thereof so as to close/open the intake bypass line 9. In the exhaust gas line 5, shut-off valves 13 and 14 are also provided at the upstream side of the junctions 150 and 152 respectively so that the exhaust lines 5a and 5b are respectively opened/closed. In this embodiment, electromagnetic valves are employed as the four shut-off valves 11–14.

Figure 1:
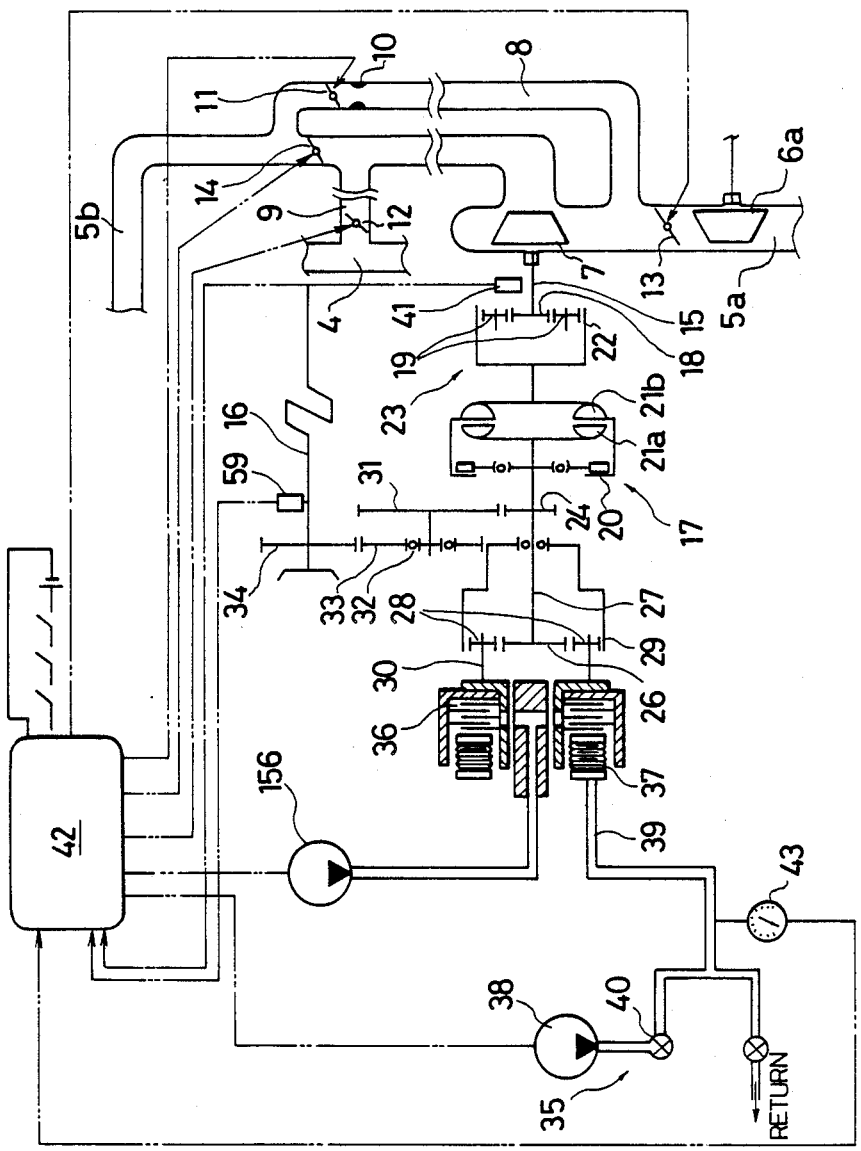
FIG. 1 is a detailed view showing a reversing mechanism of a preferred embodiment of a turbo compound engine according to the present invention.

The crankshaft 16 of the engine 1 and the output shaft 15 of the power turbine 15 are connected to each other by means of a reversing mechanism 17 which transmits rotational power between the crankshaft 16 and the power turbine 15 in both directions. The reversing mechanism 17 is illustrated in FIG. 1. An output gear 18 is secured to an extending end of a shaft 15 of the power turbine 7, and plural planetary gears 19 are engaged with the output gear 18. The planetary gears 19 are engaged with a ring gear 22 which is rotated with an output pump wheel 21b of a fluid coupling 21 provided with a lock-up mechanism. In other words, the output gear 18 is connected to the fluid coupling 21 via a planetary gear mechanism 23 including the planetary gears 19 and the ring gear 22, so that the rotative power is transmitted from the power turbine 7 to the output pump wheel 21a of the fluid coupling 21. A first transmission gear 24 is secured to the output pump wheel 21a so that those two elements rotate together.

Another planetary gear mechanism or a second planetary gear mechanism 25 is provided next to the first planetary gear mechanism 23. The second planetary gear mechanism 25 comprises a sun gear 26 whose shaft 27 is fixed to the output pump wheel 21a, plural planetary gears 28 geared with the sun gear 26, a ring gear 29 around the planetary gears 28 so as to be geared with the planetary gears 28, a carrier 30 which causes the planetary gears 28 to rotate around the sun gear 26 as well as their own axes, a second transmission gear 31 geared with the first transmission gear 24, a third transmission gear 33 coaxial with the second transmission gear 31 so that it may transmit the rotative power from the crankshaft gear 34 of the crankshaft 16 to the second transmission gear 31 via a one-way clutch 32, and hydraulic clutch means 35 which stops/frees the carrier 30. It has been found that changing the clutch engagement force for the hydraulic clutch means 35 stepwise from weak to strong is effective to prevent the overshoot of the braking effort when the rotation of the power turbine is reversed. This is because the very large force produced at the beginning of reversing is absorbed by the hydraulic clutch means as slippage. Thereupon, the hydraulic clutch means 35 comprises a hydraulic clutch 37 for stopping the rotation of the carrier 30, the hydraulic clutch being disconnectable with a clutch portion 36 which is shaped like a flange extending in the radial direction of the carrier 30 so that the rotation of the carrier 30 may be stopped when connected, a pump 38 functioning as a biasing means for feeding an adjusted amount of working oil to the hydraulic clutch 37 thereby adjusting the engagement force of the hydraulic clutch 37, and a valve 40 disposed in an oil path 39 between the pump 38 and the clutch 37. The pump 38 and other elements are controlled by a controller 42.

Referring to FIG. 1, the controller 42 receives at the input thereof an ON/OFF signal from a clutch switch (not shown) of the engine 1, an ON/OFF signal from an accelerator switch (not shown), an engine rotational speed signal detected by a sensor 45, a brake control switch signal, a power turbine rotational speed pulse signal from the sensor 41, and a hydraulic pressure signal indicative of the working oil pressure between the valve 40 and the hydraulic clutch 37, which is detected by a sensor 43, while from the output thereof it supplies control signals for the first to fourth valves 11, 12, 13, and 14, as well as for the valve 40 for the reversing mechanism 17. The controller 42 possesses control maps 144 and 145 which determine, in combination, control signals to adjust the discharge amount of oil from the pump 38 in accordance with the rotating speeds of the crankshaft and the power turbine 7 (more precisely, in accordance with rotating speed indicating signals) when the power turbine 7 is reversed in rotation.

Figure 5:
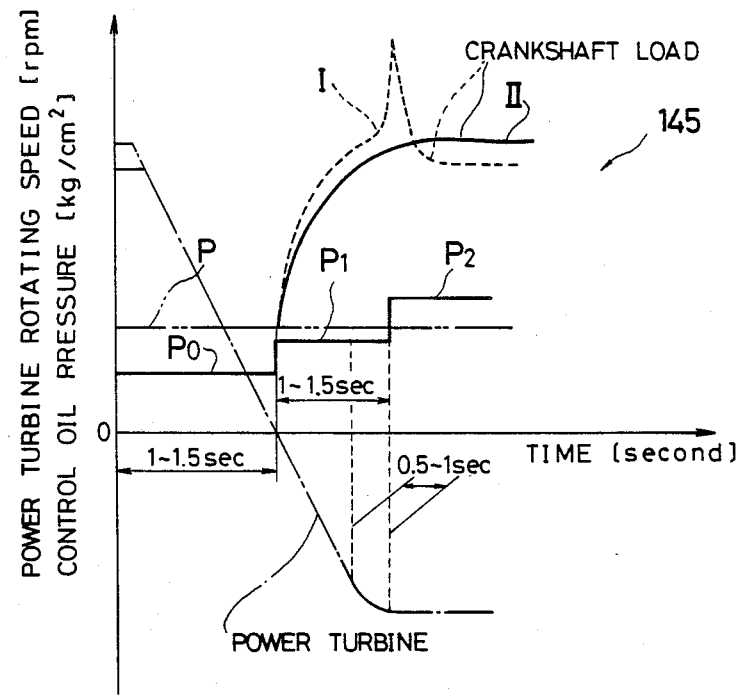
Figure 6:
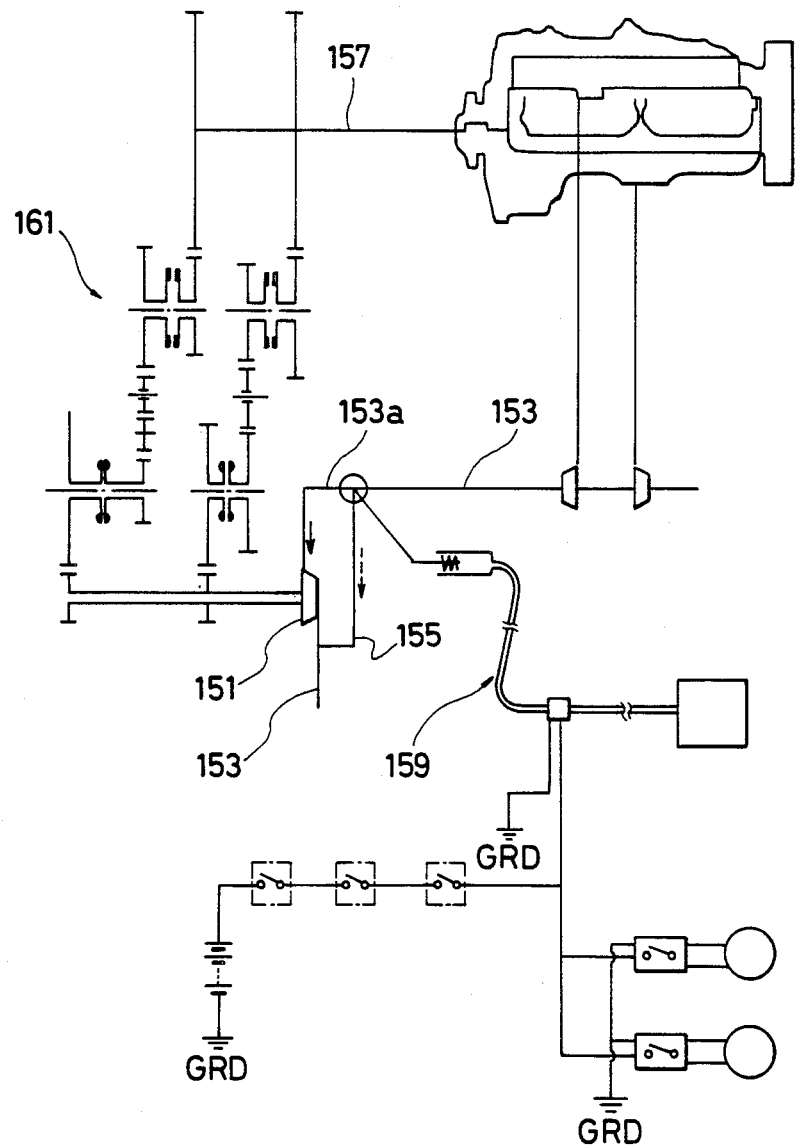
FIG. 6 depicts a schematic view of a turbo compound engine forming related art.

In the control map 144, three curves P0, P1, and P2 are drawn: P0 is the pressure required for the hydraulic clutch of the reversing mechanism 17 such that the power turbine 7 is stopped within a predetermined time (for instance, 1 to 1.5 seconds) after the reversing mechanism 17 is switched to reversing mode with the engine rotating speed NENG; P1 is the pressure required for the hydraulic clutch to force the power turbine 7 to reach a predetermined rotating speed within a predetermined time (for instance, 1 to 1.5 second) from the start of reverse rotation; and P2 is the pressure required to drive the power turbine 7 with a safety transmission torque. FIG. 5 shows another control map 145, in which relations among the pressures for the clutch engagement, time to maintain the pressure, and the power turbine rotating speed are depicted.

Figure 3:
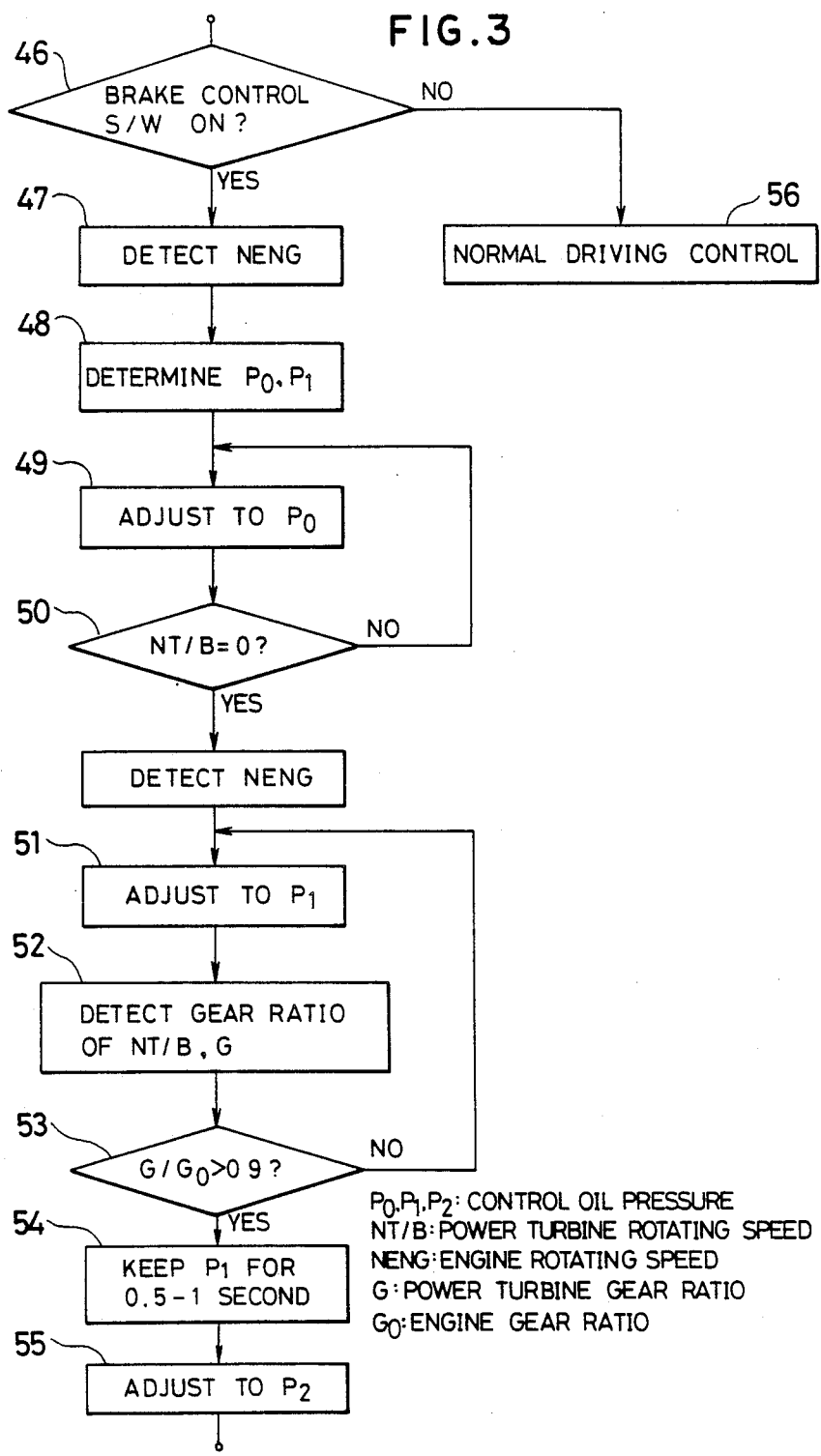
FIG. 3 is a flow chart of a controller according to the present invention.
Figure 4:
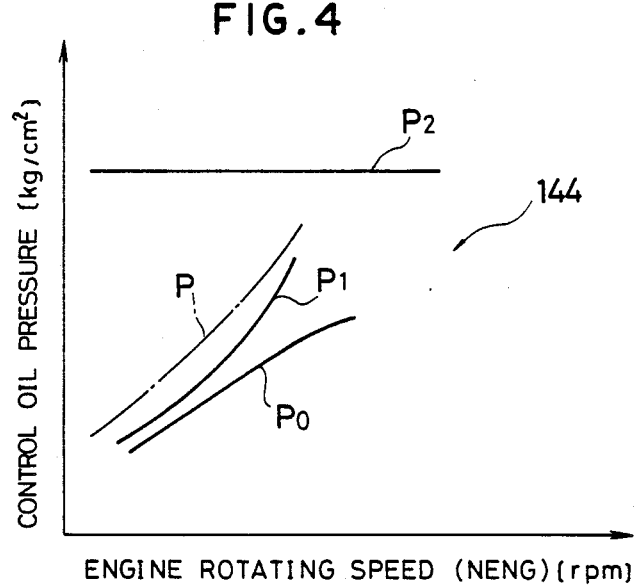
FIGS. 4 and 5 are diagrams or control maps employed for the controller of FIG. 3 respectively.

Operation of the controller 42 will be now explained with reference to the flow chart shown in FIG. 3. When th accelerator switch and the clutch switch are both OFF engine rotating speed is, for example, is over 700 rpm, and the brake control switch ON at step 46, i.e., when the answer of the step 46 is YES, (in- case-of-NO operation will be described later) the controller 42 outputs signals to close the valves 13 and 14 while outputting a signal to open the valve 11 since the vehicle is in a deceleration mode. Then, the controller 42 outputs another signal to open the valve 40 so as to turn the hydraulic clutch 35 into engagement mode. Thereupon, rotative power of the crankshaft 16 is transmitted to the power turbine 7 through the reversing mechanism 17 so that rotative power is applied in the counter direction against the direction the power turbine 7 is rotating in. Just after that, the controller 42 detects the engine rotating speed NENG through the sensor 45 at the step 47, and determines the engagement pressure P0 and P1 with reference to the maps 144 and 145 at step 48. The discharging oil pressure of the hydraulic pump 38 is adjusted to P0 at the step 49. Wheather the rotating speed of the power turbine 7 is zero or not is detected at step 50. If the answer there at is NO, the program returns to step 49. Otherwise, the controller 42 detects the engine rotating speed again. After that, the discharging oil pressure of the hydraulic pump 38 is adjusted to P1 at step 51. The controller 42 detects the gear ratio G of the power turbine 7 (the gear ratio depends on the reversing mechanism 17) at step 52. The step 53 judges whether the ratio of the gear ratio G to the engine gear ratio Go is larger than 0.9: if the answer is NO, the program returns to step 51 while if the answer is YES, the pressure P1 is maintained for 0.5 to 1 second by step 54. Then, the hydraulic pump pressure is adjusted to P2 at step 55. Meanwhile, after executing step 49, the controller 42 sends a signal to the shut-off valve 12 to open the intake air bypass line 9. As the intake air bypass line is opened, air is introduced to the intake air bypass line 9 in response to the rotating speed of the power turbine 7, whereby the power turbine performs compressor work.

When the answer at step 46 is NO, the normal driving control is executed at step 56. Specifically, the controller 42 opens the valves 13 and 14 while closing the valves 11, 12 and 40. The gear ratio G of the power turbine and the same Go of the engine are detected by non-contact sensors respectively. Reference numeral 156 is another oil pump for feeding oil as a coolant to the clutch portion 36.

In the illustrated embodiment, the shut-off valves 11 to 14, 40 and the hydraulic pump 38 are controlled by the controller 42, however, the valves 11 to 14 and 40, and the hydraulic pump may be controlled in a manner such that the valves 11 to 14 and 40 are opened/closed by a timer and that the hydraulic pump may be controlled by a relay circuit which adjusts the oil pressure by means of such timer. Also, the pressures P0, P1, and P2, with the engine rotating speed being at NENG when the reversing mode starts, may be applied in turn to the clutch in accordance with the values detected by the oil pressure sensor 43, P0 being smaller than P1, and P1 smaller than P2.

As appreciated from the above description, according to the turbo compound engine of the present invention, no overshoot occurs during the reversing operation of the reversing mechanism and an unduly large load is not imposed on the power transmission system between the crankshaft and the power turbine.

I claim:
1. A turbo compound engine, comprising:
   an engine possessing an intake air passage, an exhaust gas passage and a crankshaft;
   a power turbine disposed in the exhaust gas passage, the power turbine being rotatable both in normal and reverse senses;
   a reversing mechanism including a friction type clutch having an engagement mode for connecting the power turbine with the crankshaft such that the rotational direction of the power turbine is reversed when the friction type clutch is switched to its engagement mode; and
   biasing means for exerting pressure on the friction type clutch so as to adjust the strength of engagement between the crankshaft and the power turbine in a manner such that the biasing means causes the friction type clutch to produce a first amount of frictional torque sufficient in magnitude to stop the power turbine from rotating in the normal direction when the clutch is switched to its engagement mode and to produce a second amount of frictional torque when the power turbine starts rotating in the reverse direction, said second amount being greater than said first amount.

2. A turbo compound engine according to claim 1, including an exhaust gas bypass line having both ends thereof connected to the exhaust gas passage so as to bypass the power turbine, an intake air bypass line having one end thereof connected to the intake air passage and the other end thereof connected to the exhaust passage downstream of the power turbine but upstream of the downstream side junction with the exhaust gas bypass line, any one of a plurality of fixed throttling means respectively of different sizes in the exhaust gas bypass line for determining the flow rate of the exhaust gas passing therethrough, a first shut-off valve for opening and closing the exhaust gas bypass line, a second shut-off valve in the upstream end of the intake air bypass line so as to open and close the intake air bypass line, a third shut-off valve and a fourth shut-off valve respectively disposed upstream of the junctions of the exhaust gas passage and the exhaust gas bypass line for opening and closing party of the exhaust gas passage upstream of the third and fourth valves.

3. A turbo compound engine according to claim 2, wherein the first, second, third and fourth shut-off valves are electromagnetic valves.

4. A turbo compound engine according to claim 1, wherein first and second planetary gear mechanisms are further provided, the power turbine possesses an output gear, said output gear and the first and second planetary gear mechanisms are in turn geared with one another, and the second planetary gear mechanism is connected to the crankshaft via the friction type clutch.

5. A turbo compound engine according to claim 4, wherein the friction type clutch includes hydraulic clutch means, the engagement force for the hydraulic clutch means can be changed stepwise from a weak force to a stronger force by the biasing means.

6. A turbo compound engine according to claim 5, wherein the engagement force for the hydraulic clutch is changed stepwise based on the engine rotating speed and the power turbine rotating speed when the friction type clutch is in its engagement mode.

* * * * *